April 22, 1958
H. D. JACOBY
2,831,737
BEARING CONSTRUCTION
Filed Feb. 4, 1957
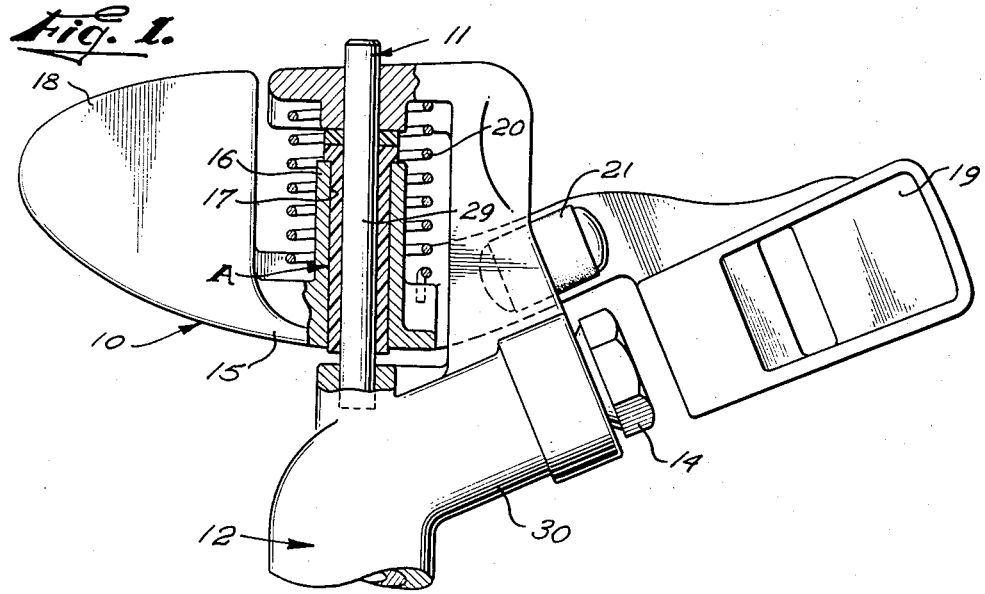
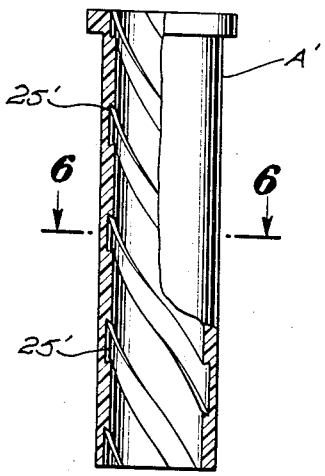
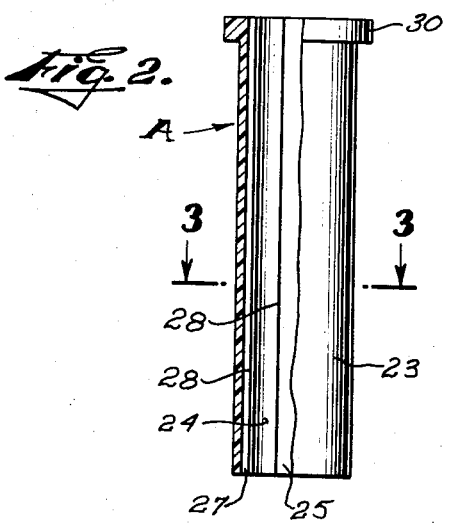
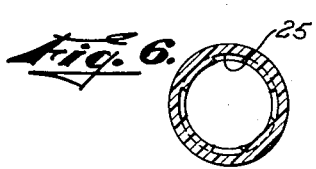
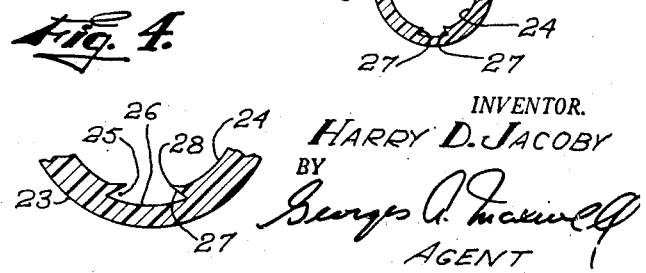
INVENTOR.
HARRY D. JACOBY
BY
AGENT United States Patent Office 2,831,737
Patented Apr. 22, 1958

2,831,737

BEARING CONSTRUCTION

Harry D. Jacoby, Torrance, Calif., assignor to Walter V. Storm, Rolling Hills, Calif.

Application February 4, 1957, Serial No. 638,125

9 Claims. (Cl. 308—238)

This invention relates to a bearing construction and is more particularly concerned with an improved plastic sleeve type bearing construction which is suitable for use in the presence of abrasive materials.

Plastic materials such as the long chain polymeric amides, one of which is commonly referred to as nylon, have excellent bearing characteristics, that is, they are tough and durable and have a very low coefficient of friction with metal. As a result of the above, nylon is finding wide use as a bearing material.

While nylon is an excellent bearing material, there are many situations where it cannot be advantageously employed. One of these situations is where abrasive material, such as sand and/or silt is present, since due to the relative soft, plastic characteristics of nylon, the abrasive material which finds its way between the bearing surfaces, becomes embedded in the nylon with the result that the nylon becomes a carrier for the abrasive.

An object of the present invention is to provide a self-cleaning nylon sleeve bushing or bearing that can be advantageously used in the presence of abrasive materials such as sand, without deleterious effect.

Another object of the present invention is to provide a novel nylon bearing construction of the character referred to that can be advantageously molded or cast and which is extremely inexpensive of manufacture.

A feature of the present invention is to provide a nylon bearing sleeve having longitudinally disposed channels or grooves in its bearing surface, which grooves have side walls which cooperate with the bearing surface to establish wiping lips which serve to wipe the opposing bearing surface clean of foreign matter and cause it to drop or flow out of engagement from the bearing through the channels.

Another feature of the present invention is to provide wiping lips in a bearing construction of the character referred to above, which normally yieldingly engage and establish lapped wiping engagement on the opposing bearing surface.

The various objects and features of my invention will be fully understood from the following detailed description of typical preferred forms and applications of my invention, throughout which description reference is made to the accompanying drawings, in which:

Fig. 1 is a view of a portion of an overhead sprinkler construction with certain parts thereof shown in section and showing the bearing construction provided by the present invention engaged therein.

Fig. 2 is an enlarged view of the bearing construction that I provide and having a portion thereof broken away to show in section.

Fig. 3 is a transverse sectional view of the construction illustrated in Fig. 1 and taken as indicated by line 3—3 on Fig. 2.

Fig. 4 is an enlarged detailed sectional view of a portion of the structure shown in Fig. 3.

Fig. 5 is a view similar to Fig. 2 and showing another form of the present invention.

Fig. 6 is a transverse sectional view of the construction illustrated in Fig. 5 and taken as indicated by line 5—5 on Fig. 5.

In Fig. 1 of the drawings I have shown the bearing construction A of the present invention rotatably supporting an oscillating, spring-loaded, hydraulically actuated driver 10 on a support pin 11 projecting upwardly from the water distributing head 12 of a rotating agricultural sprinkler construction.

The water distributing head 12 of the sprinkler construction is rotatably carried by a suitable water conducting spindle (not shown) and has an upwardly and laterally outwardly inclined branch or arm 13 at its upper end, which arm is provided with a suitable nozzle 14 adapted to direct a stream or jet of water away from the sprinkler construction.

The support pin 11 for the driver 10 is engaged in a suitable boss at the top of the distributing head 12 to project upwardly therefrom and concentric with the rotative axis thereof.

The spring-loaded hydraulically actuated driver 10 is adapted to rotate the head 12 relative to the spindle on which it is engaged and includes an elongate substantially horizontally disposed body 15 having an elongate vertically disposed boss 16 with a central longitudinally disposed opening 17 extending therethrough, and in which the bearing construction A is snugly engaged. The bearing construction A engaged in the opening 17 of the boss 16 is adapted to slidably receive the support pin 11 on the sprinkler head 12 and rotatably mount the driver thereon.

The driver 10 further includes an inertia weight 18 at one end and a deflector spoon 19 at the other end. A suitable helical torsion spring 20 is fixed to and extends between the driver 15 and the distributor head 12 and normally yieldingly urges the deflecting spoon 19 of the driver into engagement with the jet of water issuing from the nozzle 14.

A suitable stop or bumper 21 is provided on the head 12, which bumper is engaged by and stops the driver each time the deflecting spoon thereof is urged or rotated by the spring into engagement with the jet of water. Each time the driver 10 strikes the bumper 21, the inertia of the driver is transmitted to the distributing head 12 and rotates the head a short distance relative to the spindle.

With the above relationship of parts, it will be apparent that the driver 10 constantly oscillates about the support pin 11 and relative to the head 12, when the sprinkler is in operation, with the result that the bearing construction A related thereto is subject to severe working conditions.

Due to the nature of the construction in which I have shown my bearing construction A engaged, that is, in an agricultural sprinkler, it will be apparent that sand and silt is free to find its way into or about the bearing construction when the construction is dropped into the mud, or as a result of wind and/or splashing, and in such a manner that an ordinary bearing would soon be worn out and rendered ineffective.

The bearing construction A that I provide and which is illustrated in Figs. 1 to 4 of the drawings is a simple, elongate vertically disposed tubular body of nylon having a straight, cylindrical outer wall 23 adapted to slidably engage in the opening 17 in the boss 16 of the driver 10, a straight, cylindrical inner wall 24 establishing a bearing surface and adapted to slidably receive the support pin 11 of the sprinkler construction and a plurality of straight, longitudinally disposed radially inwardly opening channels 25 in the inner wall and through which foreign matter, such as sand, is free to drop or flow.

The channels 25 are shown as having cylindrical bottom walls 26 and radially inwardly convergent side walls 27, which side walls converge with the inner bearing surface 24 to establish opposed longitudinally disposed wiping lips 28 along the opposite sides of the channels. The wiping lips 28 serve to wipe the outside or bearing surface 29 of the support pin 11 as the driver 10 and bearing A oscillate thereabout, with the result that any foreign matter finding its way into the bearing construction is wiped into the channels 25 where it is free to drop downwardly and away from the bearing.

In the preferred carrying out of the invention, the wiping lips 28 are pitched radially inwardly so that they project inwardly from the bearing surface 24 a slight amount, say, for example, one one-thousandth of an inch, when the bearing is molded and before the stem 11 is engaged therein.

The side walls 27 of the channels 28 being radially inwardly divergent, provide sufficient relief outward or behind the sealing lips 28 to allow the lips to be flexed radially outward with little effort, when the stem is slid into bearing engagement with the bearing surface 24 of the construction.

The memory and resiliency of the nylon, of which the bearing is formed, normally yieldingly urges the lips 28 into lapped wiping engagement with the stem.

In practice, a suitable radially outwardly projecting stop flange 30 is provided at the upper end of the body, which flange is adapted to engage the top of the boss 16 in which the bearing is engaged and thereby limit the engagement of the bearing in the opening 17. The bearing A establishes a snug fit in the opening in the boss, to assure that relative rotation will occur between the bearing and the stem and so that the bearing will not work or shift out of proper working position, but not so snug as would result in deformation of the nylon bearing.

In the form of the invention illustrated in Figs. 5 and 6 of the drawings, the bearing construction A' is identical to the first form described above, except that the channels 25' therein are helical, rather than straight. The primary purpose of providing helical channels in this second form of the invention is so that the bearing can operate satisfactorily in a horizontal position. That is, when the second form of bearing construction is operated in a horizontal position, the side walls 27' of the helical channels 27' always present an inclined surface along which foreign matter will slide and eventually work itself out and away from the bearing construction, as the bearing is oscillated or rotated.

The channels, being open at the ends of the body allows for easy flushing of foreign and/or abrasive material out of the bearing, with the result that the bearing is particularly adapted for use in situations where bearing seals cannot be used or are ineffective.

It is to be understood that in practice, the particular bearing constructions that I provide can be advantageously employed in many situations and incorporated in mechanisms other than sprinklers, and that the particular sprinkler installation illustrated and described above is for the purpose of illustration only.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. Self-cleaning bearing sleeve including, an elongate tubular body having an inner cylindrical bearing surface and a plurality of radially inwardly opening channels extending from one end thereof to the other and open at their ends, each channel having side walls that converge with the said bearing surface to establish longitudinal wiping lips, which lips serve to wipe an opposing bearing surface and direct foreign matter into the channels, from which said foreign matter is discharged.

2. A self-cleaning bearing sleeve including, an elongate tubular body of nylon having an inner cylindrical bearing surface and a plurality of radially inwardly opening channels extending from one end thereof to the other and open at their ends, each channel having laterally spaced side walls that converge with the said bearing surface to establish resilient wiping lips, which lips serve to wipe an opposing bearing surface and direct foreign matter into the channels, from which said foreign matter is discharged.

3. A self-cleaning bearing sleeve of the character described including, an elongate tubular body having an inner cylindrical bearing surface with a plurality of radially inwardly opening channels extending from one end thereof to the other and open at their ends, each channel having radially inwardly divergent side walls that converge with the said bearing surface to establish opposed longitudinal wiping lips, said lips being pitched to normally project radially inwardly from the bearing surface and to establish yielding wiping engagement on an opposing bearing surface and direct foreign matter into the channels, from which said foreign matter is discharged.

4. A self-cleaning bearing sleeve including, an elongate tubular body having an inner cylindrical bearing surface and a plurality of straight longitudinally disposed radially inwardly opening channels extending from one end thereof to the other and open at their ends, each channel having side walls that converge with the said bearing surface to establish wiping lips, which lips serve to wipe an opposing bearing surface and direct foreign matter into the channels, from which said foreign matter is discharged.

5. A self-cleaning bearing sleeve including, an elongate tubular body of nylon having an inner cylindrical bearing surface and a plurality of straight longitudinally disposed radially inwardly opening channels extending from one end thereof to the other and open at their ends, each channel having lateral side walls that converge with the said bearing surface to establish resilient wiping lips, which lips serve to wipe an opposing bearing surface and direct foreign matter into the channels, from which said foreign matter is discharged.

6. A self-cleaning bearing sleeve of the character described including, an elongate tubular body of molded nylon having an inner cylindrical bearing surface with a plurality of straight longitudinally disposed radially inwardly opening channels extending from one thereto to the other and open at their ends, each channel having laterally spaced radially inwardly divergent side walls that converge with the said bearing surface to establish opposed longitudinal wiping lips, said lips being pitched to normally project radially inwardly from the bearing surface and to establish yielding wiping engagement on an opposing bearing surface and direct foreign matter into the channels, from which said foreign matter is discharged.

7. A self-cleaning bearing sleeve including, an elongate tubular body having an inner cylindrical bearing surface and a plurality of radially inwardly opening helical channels extending from one end thereof to the other and open at their ends, each channel having side walls that converge with the said bearing surface to establish wiping lips, which lips serve to wipe an opposing bearing surface and direct foreign matter into the channels, from which said foreign matter is discharged.

8. A self-cleaning bearing sleeve including, an elongate tubular body of nylon having an inner cylindrical bearing surface and a plurality of radially inwardly opening helical channels extending from one end thereof to the other and open at their ends, each channel having laterally spaced side walls that converge with the said bearing surface to establish resilient wiping lips, which lips serve to wipe an opposing bearing surface and direct foreign matter into the channels, from which said foreign matter is discharged.

9. A self-cleaning bearing sleeve of the character described including, an elongate tubular body of molded nylon having an inner cylindrical bearing surface with a plurality of radially inwardly opening helical channels extending from one end thereof to the other and open at their ends, each channel having laterally spaced radially inwardly divergent side walls that converge with the said bearing surface to establish opposed longitudinal wiping lips, said lips being pitched to normally project radially inwardly from the bearing surface and to establish yielding wiping engagement on an opposing bearing surface and direct foreign matter into the channels, from which said foreign matter is discharged.

References Cited in the file of this patent

UNITED STATES PATENTS

| | | |
|---|---|---|
| 2,339,645 | MacGill | Jan. 18, 1944 |
| 2,389,253 | Gatke | Nov. 20, 1945 |
| 2,675,283 | Thomson | Apr. 13, 1954 |
| 2,793,087 | Hayes | May 21, 1957 |